(12) United States Patent
Berg et al.

(10) Patent No.: US 8,241,448 B2
(45) Date of Patent: Aug. 14, 2012

(54) FILM ADHESIVE BONDING APPARATUS AND PROCESS

(75) Inventors: Avrid J. Berg, Seattle, WA (US);
Donald A. Anderson, Bellevue, WA (US); Paul S. Gregg, Seattle, WA (US);
Michael L. Leggett, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 11/558,210

(22) Filed: Nov. 9, 2006

(65) Prior Publication Data

US 2008/0113191 A1 May 15, 2008

(51) Int. Cl.
*B29C 65/50* (2006.01)
(52) U.S. Cl. ........ 156/87; 156/295; 156/306.6; 156/313
(58) Field of Classification Search .......... 156/87, 156/295, 306.6, 313
See application file for complete search history.

(56) References Cited

U.S. PATENT DOCUMENTS

| | | | |
|---|---|---|---|
| 2,304,718 A * | 12/1942 | Swart | 428/189 |
| 3,962,015 A * | 6/1976 | Heimann | 156/295 |
| 4,555,604 A | 11/1985 | Maier et al. | |
| 4,908,273 A | 3/1990 | Urech et al. | |
| 4,966,802 A | 10/1990 | Hertzberg | |
| 5,556,565 A * | 9/1996 | Kirkwood et al. | 219/633 |
| 5,618,606 A | 4/1997 | Sherrick et al. | |
| 6,863,944 B2 * | 3/2005 | Naipawer et al. | 428/40.1 |
| 2002/0005656 A1 * | 1/2002 | Seifert | 296/210 |
| 2005/0215032 A1 | 9/2005 | Seo et al. | |
| 2005/0236101 A1 * | 10/2005 | Kobayashi | 156/295 |

FOREIGN PATENT DOCUMENTS

JP 2005350520 A 12/2005

OTHER PUBLICATIONS

Ashcroft, et al.; Adhesive Bonding of Fibre Reinforced Polymer Composite Materials; Assembly Automatoin, vol. 20, No. 2, Year: 2000; Abstract.
LeGrand, David S.; "An Examination of an Adhesive Bonding Portfolio to Satisfy the Need for Out of Autoclave Processing"; Hendkel Aeropsace, Bay Point CA. SAMPE ISTC San Deigo, CA, Nov. 15-18, 2004; Abstract.
Cichon, Michael J. et al; New 121°C (250°F) Curing Epoxy Film Designed for Composite and Metallic Aerospace Bonding; Locite Aerospace, Bay Point CA SAMPE 2002, Long Beach May 12-16, 2002; Abstract.
Brockmann, et al; Adhesive Bonding, Materials, Applications and Technology; Published in 2008 by Wiley-VCH, Germany; pp. 16-18.

* cited by examiner

*Primary Examiner* — Christopher Schatz
(74) *Attorney, Agent, or Firm* — Klintworth & Rozenblat IP LLC

(57) ABSTRACT

The invention relates to a method of bonding two members together utilizing a stack of solid film adhesive and a layer of solid film adhesive, both disposed between the members. A pressure-applying device may be utilized to apply low pressure to force the members together. The pressure may force the stack to compress and expand in varying directions in order to substantially remove air-bubbles between the layer and one of the members. A heating device may be utilized to change the layer and the stack into liquid states in order to bond the members together with a void-free bond-line.

22 Claims, 1 Drawing Sheet

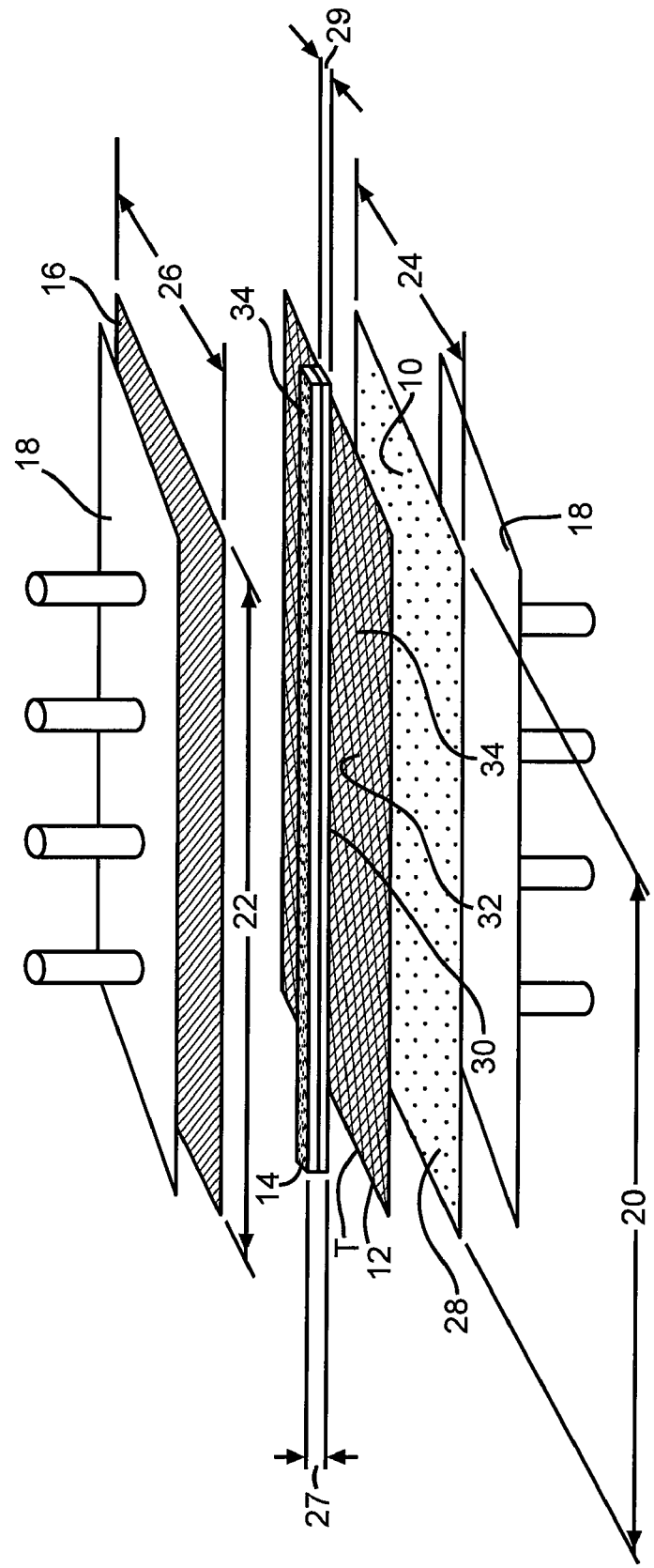

FILM ADHESIVE BONDING APPARATUS AND PROCESS

BACKGROUND OF THE INVENTION

A wide variety of bonding processes are known which may be used to bond two members together, such as bonding titanium and composite aircraft floor beams. Some of the prior art methods utilize low temperature cure paste adhesives. However, these paste adhesives often have not provided acceptable peel strength and/or experienced other types of problems. Other prior art methods have utilized the use of auto-clave vented bag cures utilizing film adhesives. However, these methods often suffer from one or more problems such as undesirable bond-line void content, the use of expensive bagging and auto-clave cure cycles, long bonding time, difficult bonding procedures, low strength bond-lines, increased bond failure, and/or other types of problems.

A film adhesive bonding process and/or a film adhesive bonded apparatus is needed which may solve or reduce one or more problems associated with one or more of the prior art apparatus and/or processes.

SUMMARY OF THE INVENTION

In one aspect of the invention, a method of bonding two members together comprises providing first and second members each having length and width dimensions. Each of the length dimensions is substantially greater than each of the width dimensions. A layer of a first film adhesive is placed, in a solid state, so that the layer substantially covers a side of the first member. A stack of a second film adhesive, in another solid state, is placed so that the stack is aligned along a length-wise center section of a side of the layer. While in this alignment, the stack does not cover a substantial portion of the side of the layer. The second member is aligned with the first member so that the layer and the stack are disposed between the first and second members. Pressure is applied to force the first and second members together to cause the stack to compress in a height direction and to expand in a width direction in order to force the stack to substantially cover the side of the layer. In such manner, air-bubbles are substantially removed from between the layer and the side of the first member. The first and second members are heated, while under pressure, to turn each of the layer and the stack into liquid states in order to bond the first and second members together.

In another aspect of the invention, a differing method of bonding two members together is provided. The method comprises providing first and second members each having length and width dimensions. Each of the length dimensions are substantially greater than each of the width dimensions. A stack of film adhesive is placed, in a solid state, so that the stack is aligned along a length-wise center section of a side of the first member. While in this alignment the stack does not cover a substantial portion of the side of the first member. The second member is aligned with the first member so that the stack is disposed between the first and second members. Low pressure is applied to force the first and second members together to cause the stack to compress in a height direction and to expand in a width direction, in order to force the stack to substantially cover the side of the first member. The first and second members are heated, while under low pressure, to turn the stack into a liquid state in order to bond the first and second members together with a substantially void-free bond-line.

In a further aspect of the invention, an apparatus is provided which comprises first and second members bonded together. When the first and second members were bonded together, a layer of a first film adhesive was placed, in a solid state, so that the layer substantially covered a side of the first member. A stack of a second film adhesive was placed, in another solid state, so that the stack was aligned along a length-wise center section of a side of the layer. While in this alignment, the stack did not cover a substantial portion of the side of the layer. The second member was aligned with the first member so that the layer and the stack were disposed between the first and second members. Pressure was applied to force the first and second members together causing the stack to compress in a height direction and to expand in a width direction. In such manner, the stack was forced to substantially cover the side of the layer, and to substantially remove air-bubbles from between the layer and the side of the first member. The first and second members were heated, while under pressure, to turn each of the layer and the stack into liquid states thereby bonding the first and second members together.

These and other features, aspects and advantages of the invention will become better understood with reference to the following drawings, description and claims.

BRIEF DESCRIPTION OF THE DRAWINGS

FIG. 1 depicts a perspective, unassembled view showing the use of various components employed during one embodiment of a method of bonding two members together under the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In one embodiment of a method of bonding two members together under the invention, as depicted in FIG. 1, a first member 10, a layer 12 of a first film adhesive in a solid state, a stack 14 of a second film adhesive in a solid state, and a second member 16 in a solid state may be placed in a pressure-applying device 18. Either of the first and second members, 10 and 16, may be made of Titanium or a laminate composite. In other embodiments, the first and second members, 10 and 16, may be made of any type of metal, composite, or other material. Each of the first and second members, 10 and 16, may have length dimensions 20 and 22 which are substantially larger than their width dimensions 24 and 26. One or more of the width dimensions, 24 and 26, may be less than 10 inches, while one or more of the length dimensions, 20 and 22, may be as long as needed. In one embodiment, the length dimensions, 20 and 22, may be at least twice as large as the width dimensions, 24 and 26. In other embodiments, other width and length dimensions may be utilized. The first and second members, 10 and 16, may comprise at least one of aircraft and spacecraft parts. In other embodiments, the first and second members, 10 and 16, may comprise non-aircraft parts such as automobile parts, engine parts, and other types of parts. In still other embodiments, the first and second members, 10 and 16, may comprise other types, sizes, configurations, and/or orientations.

The layer 12 of the first film adhesive, which may comprise an epoxy, may be embedded with fiber and may be placed so that the layer 12 substantially covers a side 28 of the first member 10. The layer 12 may have a thickness T in the range of 0.005 inches to 0.015 inches. In other embodiments, the layer 12 may be comprised of differing material, may be located in differing orientations and configurations relative to side 28 of first member 10, and may be of varying shapes and sizes. The stack 14 of the second film adhesive may have a height 27 substantially in the range of 0.04 inches to 0.10 inches, and width 29 substantially in the range of 0.25 inches to 1 inch. The stack 14 of the second film adhesive, which may be made of an epoxy and may not be embedded with fiber, may be placed so that it is aligned along a length-wise center section 30 of a side 32 of the layer 12. In this alignment, the stack 14 may not cover a substantial portion 34 of side 32 of layer 12. The second member 16 may be aligned with respect to the first member 10 so that the layer 12 and the stack 14 are disposed between the first and second members 10 and 16. In other embodiments, the stack 14 may be comprised of differing material, may be located in differing orientations and configurations relative to side 32 of layer 12, and may be of varying shapes and sizes.

Low pressure may be applied utilizing the pressure-applying device 18 to force the first and second members 10 an 16 together to cause the stack 14 to compress in height 27 and to expand in width 29. The pressure may be substantially in the range of one pound per square inch to five inches per square inch. In other embodiments, the pressure may be in varying amounts. The pressure may force the stack 14 to spread out in order to substantially cover the side 32 of layer 12. This spreading movement of the stack 14 against the side 32 of layer 12 may substantially remove air-bubbles between the layer 12 and the side 28 of the first member 10 by forcing the layer 12 against side 28 of the first member 10 in a generally rolling-out type of movement. The pressure-applying device 18 may comprise a clamp, a pneumatic device, a spring, or another type of device.

The entire pressure-applying device 18, with the compressed together first member 10, layer 12, stack 14, and second member 16 may be placed in a heating device (not shown). The heating device (not shown) may heat each of the first and second members, 10 and 16, while they are under pressure by the pressure-applying device 18 in order to turn each of the layer 12 and stack 14 from their solid states into liquid states in order to bond the first and second members 10 and 16 together. The applied heat may be substantially in the range of 150 degrees Fahrenheit to 350 degrees Fahrenheit, or in varying amounts. The heating device (not shown) may comprise an oven, or other type of device which applies heat.

The layer 12 of the first film adhesive and the stack 14 of the second film adhesive may have viscosities which are over one-million poise at room temperature, and viscosities which are substantially between nine-hundred to twenty-seven-hundred poise after being heated. As a result, the application of low heat to the layer 12 and the stack 14 may allow the layer and stack, 12 and 14, to turn into liquid states from solid states in order to bond the first and second members 10 and 16 together. The entire heating process may take 60 to 90 minutes. In other embodiments, the heating process may take varying amounts of time, and the layer and the stack, 12 and 14, may have varying viscosities. Neither an auto-clave, a bag, nor a vacuum need to be utilized during the application of the instant method. The instant method may bond the first and second members, 10 and 16, together with a void-free bond-line having substantially no air-bubbles. The bond-line may be defined as the line or plane between the first and second members, 10 and 16, along which the members are bound.

In another embodiment, a method of bonding the first and second members may only involve the placing of a stack of film adhesive between the first and second members without using a layer of film adhesive. The stack may be placed along a length-wise center section of a side of one of the members, and in this alignment the stack may not cover a substantial portion of one or more sides of the members. Any of the pressure, heating, and/or other embodiments herein disclosed may be utilized during application of this method. In such manner, the stack may be compressed in a height direction and expanded in a width direction in order to force the stack to substantially cover a side of one of the members. The application of heat may change the stack from a solid state to a liquid state in order to produce a bond between the first and second members which has a substantially void-free bond-line.

In still another embodiment, an apparatus may be provided which comprises first and second members bonded together with a substantially void-free bond-line. The apparatus may comprise a portion of an aircraft or other non-aircraft part. The first and second members may have been bonded together utilizing any of the embodiments disclosed herein.

One or more embodiments of the invention may decrease one or more problems in one or more of the prior art methods and/or apparatus. For instance, the use of one or more embodiments of the invention may decrease costs, may decrease bonding time, may make it less difficult to bond members together, may improve the strength of the bond, may decrease bond failure, and/or may decrease other problems in one or more of the prior art methods and/or apparatus.

It should be understood, of course, that the foregoing relates to exemplary embodiments of the invention and that modifications may be made without departing from the spirit and scope of the invention as set forth in the following claims.

We claim:

1. A method of bonding two members together comprising:
placing a layer of a first film adhesive, in a solid state, so that a first side of said layer is disposed against a first member;
placing a stack of a second film adhesive, in another solid state, so that said stack is aligned against and along a second side of said layer with the layer and said stack disposed between the first member and a second member; wherein while in this alignment said stack does not cover a substantial portion of said side of said layer and
applying heat to turn each of said layer and said stack into liquid states, and pressure to force said first and second members towards one another, with the second member being disposed against the stack, causing said stack to compress in a height direction, to expand in a width direction, and to spread out against said second side of said layer to substantially cover said second side of said layer while removing air-bubbles between said first side of said layer and said first member in order to bond said first and second members together with a substantially void-free bond.

2. The method of claim 1 wherein at least one of said first or second members is made of Titanium.

3. The method of claim 1 wherein said first and second members comprise at least one of aircraft or spacecraft parts.

4. The method of claim 1 wherein said first and second members each have length and width dimensions with each respective length dimension being at least twice as large as its respective width dimension.

5. The method of claim 1 wherein said layer of said first film adhesive is embedded with fiber.

6. The method of claim 1 wherein said layer of said first film adhesive has a thickness in a range of 0.005 inches to 0.015 inches.

7. The method of claim 1 wherein said height of said stack is substantially in a range of 0.04 inches to 0.10 inches, and said width of said stack is substantially in the range of 0.25 inches to 1 inch.

8. The method of claim 1 wherein the step of applying pressure to force said first and second members towards one another utilizes at least one of a clamp, a pneumatic device, or a spring.

9. The method of claim 1 wherein the step of applying pressure comprises applying pressure substantially in a range of one pound per square inch to five pounds per square inch.

10. The method of claim 1 wherein the step of heating utilizes an oven.

11. The method of claim 1 wherein the step of heating comprises heating at a temperature substantially in a range of 150 degrees Fahrenheit to 350 degrees Fahrenheit.

12. The method of claim 1 wherein said first and second film adhesives have viscosities which are over one-million poise at room temperature, and viscosities which are substantially between nine-hundred to twenty-seven-hundred poise after being heated.

13. The method of claim 1 wherein the method does not utilize an auto-clave, a bag, or a vacuum.

14. The method of claim 1 wherein said first and second members each have length and width dimensions with each respective length dimension being substantially greater than its respective width dimension.

15. The method of claim 1 wherein one of the first and second members is made of a composite and the other of the first and second members is made of a composite or a metal.

16. The method of claim 1 wherein the first film adhesive and the second film adhesive are both epoxies.

17. The method of claim 1 wherein the step of applying pressure to force said first and second members towards one another utilizes at least one of a clamp, a pneumatic device, or a spring to apply low pressure to force said first and second members towards one another, the heating utilizes an oven, and the method does not utilize an auto-clave, a bag, or a vacuum.

18. The method of claim 17 wherein the step of applying pressure comprises applying pressure substantially in a range of one pound per square inch to five pounds per square inch, the heating comprises heating at a temperature substantially in the range of 150 degrees Fahrenheit to 350 degrees Fahrenheit, and the first and second film adhesives have viscosities which are over one-million poise at room temperature, and viscosities which are substantially between nine-hundred to twenty-seven-hundred poise after being heated.

19. The method of claim 1 wherein the step of placing a layer of the first film adhesive further comprises placing the first side of said layer so that it substantially covers a surface of the first member.

20. The method of claim 1 wherein the step of placing the stack of the second film adhesive further comprises aligning the stack against and along a length-wise section of the second side of said layer.

21. The method of claim 1 wherein the step of placing the stack of the second film adhesive further comprises aligning the stack against and along a length-wise center section of the second side of said layer.

22. The method of claim 1 wherein the step of placing a layer of the first film adhesive further comprises placing the first side of said layer so that it substantially covers a surface of the first member, the step of placing the stack of the second film adhesive further comprises aligning the stack against and along a length-wise center section of the second side of said layer so that it does not cover a substantial portion of said second side of said layer.

* * * * *